(12) United States Patent
Ayana et al.

(10) Patent No.: US 10,447,040 B2
(45) Date of Patent: Oct. 15, 2019

(54) PROGRAMMABLE INVERTER FOR CONTROLLABLE GRID RESPONSE

(71) Applicant: Cummins Power Generation IP, Inc., Minneapolis, MN (US)

(72) Inventors: Elias M. Ayana, Minneapolis, MN (US); Michelle Hunt, Minneapolis, MN (US); Brad K. Palmer, Ham Lake, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 774 days.

(21) Appl. No.: 14/515,108

(22) Filed: Oct. 15, 2014

(65) Prior Publication Data
US 2016/0111879 A1    Apr. 21, 2016

(51) Int. Cl.
*H02J 3/18* (2006.01)
*H02J 3/32* (2006.01)
*H02J 3/40* (2006.01)
*H02P 9/04* (2006.01)
*H02P 9/08* (2006.01)
*H02J 3/38* (2006.01)
(Continued)

(52) U.S. Cl.
CPC ............ *H02J 3/18* (2013.01); *H02J 3/381* (2013.01); *H02J 3/40* (2013.01); *H02P 9/04* (2013.01); *H02P 9/08* (2013.01); *H02J 3/32* (2013.01); *H02J 3/48* (2013.01); *H02M 5/458* (2013.01)

(58) Field of Classification Search
CPC .. H02J 3/18; H02J 3/381; H02J 3/1885; H02J 3/40; H02J 3/1835; H02J 3/48; H02J 3/32; H02P 9/08; H02P 9/04; Y02E 40/30; Y02E 40/32
See application file for complete search history.

(56) References Cited

U.S. PATENT DOCUMENTS 3,559,517 A    2/1971  Smith et al.
4,048,783 A    9/1977  Raudat et al.
(Continued)

FOREIGN PATENT DOCUMENTS

EP    2 302 755    11/2012
EP    2 566 035    3/2013
(Continued)

OTHER PUBLICATIONS

International Search Report and Written Opinion for PCT/US2015/052828, dated Dec. 18, 2015, 13 pages.
(Continued)

*Primary Examiner* — Jared Fureman
*Assistant Examiner* — Emmanuel Dominique
(74) *Attorney, Agent, or Firm* — Foley & Lardner LLP

(57) ABSTRACT

A system for providing programmable grid response characteristics includes a generator set having an alternator output voltage, where the alternator output voltage is rectified to provide DC power to a DC bus of the generator set. The system further includes a programmable inverter having power electronics configured to receive a response requirement corresponding to a code requirement of a grid, receive the DC power from the DC bus, and condition the DC power based on the response requirement to provide an AC output response. The AC output response meets specifications of the response requirement.

42 Claims, 4 Drawing Sheets

US 10,447,040 B2

Page 2

(51) Int. Cl.
*H02J 3/48* (2006.01)
*H02M 5/458* (2006.01)

(56) References Cited

U.S. PATENT DOCUMENTS

| | | |
|---|---|---|
| 4,295,135 A | 10/1981 | Sukonick |
| 4,737,680 A | 4/1988 | True et al. |
| 5,009,506 A | 4/1991 | Spies |
| 5,104,609 A | 4/1992 | Okuyama et al. |
| 5,174,090 A | 12/1992 | Teli et al. |
| 5,188,798 A | 2/1993 | Okuyama et al. |
| 5,313,564 A | 5/1994 | Kafri et al. |
| 5,657,904 A | 8/1997 | Frates et al. |
| 5,809,107 A | 9/1998 | Schmitt |
| 5,818,415 A | 10/1998 | Shirakawa |
| 5,990,622 A | 11/1999 | Schult et al. |
| 6,047,512 A | 4/2000 | Wendt et al. |
| 6,228,537 B1 | 5/2001 | Richter et al. |
| 6,245,462 B1 | 6/2001 | Kao et al. |
| 6,281,664 B1 | 8/2001 | Nakamura et al. |
| 6,304,006 B1 | 10/2001 | Jungreis |
| 6,414,424 B1 | 7/2002 | Amano |
| 6,440,821 B1 | 8/2002 | Conboy et al. |
| 6,536,027 B1 | 3/2003 | Grinchuk et al. |
| 6,853,940 B2 | 2/2005 | Tuladhar |
| 6,876,458 B2 | 4/2005 | Kraus |
| 6,890,285 B2 | 5/2005 | Rahman et al. |
| 7,025,223 B2 | 4/2006 | Hamm |
| 7,185,304 B2 | 2/2007 | Suto et al. |
| 7,215,100 B2 | 5/2007 | Velhner et al. |
| 7,432,618 B2 | 10/2008 | Taylor |
| 7,487,348 B2 | 2/2009 | Kroening |
| 7,627,626 B2 | 12/2009 | Kroening |
| 7,644,408 B2 | 1/2010 | Kroening |
| 7,668,741 B2 | 2/2010 | Ernest et al. |
| 7,689,574 B2 | 3/2010 | Chen et al. |
| 7,692,325 B2 | 4/2010 | Ichinose et al. |
| 7,703,029 B2 | 4/2010 | Bozak et al. |
| 7,761,557 B2 | 7/2010 | Fellenstein et al. |
| 7,784,056 B2 | 8/2010 | Berstis et al. |
| 7,787,596 B2 | 8/2010 | Hempel et al. |
| 7,831,971 B2 | 11/2010 | Berstis et al. |
| 7,853,948 B2 | 12/2010 | Berstis et al. |
| 7,870,594 B2 | 1/2011 | Gao et al. |
| 7,912,399 B2 | 3/2011 | Moser et al. |
| 7,937,406 B2 | 5/2011 | Shirin et al. |
| 7,948,102 B2 | 5/2011 | Schubert et al. |
| 7,962,425 B1 | 6/2011 | Oakenfull |
| 7,995,474 B2 | 8/2011 | Berstis |
| 8,028,269 B2 | 9/2011 | Bhatia et al. |
| 8,030,791 B2 | 10/2011 | Lang et al. |
| 8,067,932 B2 | 11/2011 | Teodorescu et al. |
| 8,095,933 B2 | 1/2012 | Berstis et al. |
| 8,097,971 B2 | 1/2012 | Ichinose et al. |
| 8,120,932 B2 | 2/2012 | Folts et al. |
| 8,129,851 B2 | 3/2012 | Ichinose et al. |
| 8,164,312 B1 | 4/2012 | Eitzmann |
| 8,214,773 B2 | 7/2012 | Lu et al. |
| 8,299,642 B2 | 10/2012 | Ichinose et al. |
| 8,310,101 B2 | 11/2012 | Amaratunga et al. |
| 8,310,104 B2 | 11/2012 | Gengenbach et al. |
| 8,350,397 B2 | 1/2013 | Lang et al. |
| 8,352,453 B2 | 1/2013 | Chatterjee |
| 8,355,265 B2 | 1/2013 | Gengenbach |
| 8,581,441 B2 | 11/2013 | Rotzoll et al. |
| 8,587,160 B2 | 11/2013 | Dai et al. |
| 9,620,994 B2 * | 4/2017 | Bhavaraju ............... H02J 3/381 |
| 2002/0084655 A1 * | 7/2002 | Lof ...................... F03D 7/0284 290/44 |
| 2002/0103745 A1 * | 8/2002 | Lof ...................... G06Q 40/04 705/37 |
| 2004/0046458 A1 * | 3/2004 | MacKay ................ H02J 9/002 307/80 |
| 2005/0183422 A1 * | 8/2005 | Takai .................... F01K 23/101 60/772 |
| 2007/0040263 A1 | 2/2007 | Towada |
| 2007/0057074 A1 | 3/2007 | Cheung et al. |
| 2007/0058547 A1 | 3/2007 | Berstis |
| 2007/0086215 A1 | 4/2007 | Taylor |
| 2007/0094002 A1 | 4/2007 | Berstis et al. |
| 2007/0094662 A1 | 4/2007 | Berstis et al. |
| 2007/0118839 A1 | 5/2007 | Berstis et al. |
| 2008/0122293 A1 | 5/2008 | Ohm |
| 2008/0203820 A1 | 8/2008 | Kramer et al. |
| 2008/0222631 A1 | 9/2008 | Bhatia et al. |
| 2008/0229322 A1 | 9/2008 | Berstis et al. |
| 2008/0249757 A1 | 10/2008 | Berstis et al. |
| 2008/0317213 A1 | 12/2008 | Hempel et al. |
| 2009/0293760 A1 | 12/2009 | Kumar et al. |
| 2009/0323379 A1 | 12/2009 | De Rooij et al. |
| 2010/0104315 A1 | 4/2010 | Moser et al. |
| 2010/0116250 A1 | 5/2010 | Simon et al. |
| 2010/0127576 A1 | 5/2010 | Ahlborn et al. |
| 2010/0246747 A1 | 9/2010 | Gomez et al. |
| 2010/0253151 A1 | 10/2010 | Gerhardinger et al. |
| 2010/0276998 A1 | 11/2010 | Luo et al. |
| 2010/0320842 A1 | 12/2010 | Beck |
| 2011/0049990 A1 | 3/2011 | Amaratunga et al. |
| 2011/0054709 A1 | 3/2011 | Son |
| 2011/0057444 A1 * | 3/2011 | Dai ........................ H02J 3/386 290/44 |
| 2011/0082598 A1 | 4/2011 | Boretto et al. |
| 2011/0115301 A1 * | 5/2011 | Bhavaraju ............... H02J 3/38 307/86 |
| 2011/0133552 A1 | 6/2011 | Binder et al. |
| 2011/0137987 A1 | 6/2011 | Tyree |
| 2011/0187194 A1 | 8/2011 | Keimling et al. |
| 2011/0199707 A1 | 8/2011 | Kazemi et al. |
| 2011/0204851 A1 | 8/2011 | Manotas, Jr. |
| 2011/0215652 A1 * | 9/2011 | Gengenbach ............ H02J 3/18 307/87 |
| 2011/0216562 A1 * | 9/2011 | Gengenbach ............ H02J 3/18 363/71 |
| 2011/0245990 A1 | 10/2011 | Rasmussen |
| 2011/0248569 A1 | 10/2011 | Son et al. |
| 2011/0264289 A1 * | 10/2011 | Sawyer ............ H01L 31/02021 700/287 |
| 2011/0276192 A1 | 11/2011 | Ropp |
| 2011/0298292 A1 | 12/2011 | Bremicker et al. |
| 2012/0006711 A1 | 1/2012 | Goodman et al. |
| 2012/0033473 A1 | 2/2012 | Scharf |
| 2012/0039101 A1 | 2/2012 | Falk et al. |
| 2012/0049636 A1 | 3/2012 | Galbraith et al. |
| 2012/0081938 A1 | 4/2012 | Kuenzel et al. |
| 2012/0086887 A1 | 4/2012 | Lee et al. |
| 2012/0110350 A1 | 5/2012 | Horvath et al. |
| 2012/0126623 A1 * | 5/2012 | Koehl ...................... H02J 3/383 307/76 |
| 2012/0180000 A1 | 7/2012 | Weng et al. |
| 2012/0199039 A1 | 8/2012 | Kumar et al. |
| 2012/0206260 A1 | 8/2012 | Runkle et al. |
| 2012/0209548 A1 | 8/2012 | Runkle |
| 2012/0228951 A1 | 9/2012 | Lehmann |
| 2012/0232820 A1 | 9/2012 | Wilson |
| 2012/0235498 A1 | 9/2012 | Johnson et al. |
| 2012/0245951 A1 | 9/2012 | Gips et al. |
| 2012/0280566 A1 | 11/2012 | Umland |
| 2012/0280673 A1 | 11/2012 | Watanabe et al. |
| 2012/0296904 A1 | 11/2012 | Tsai et al. |
| 2012/0306204 A1 | 12/2012 | Garcia |
| 2012/0306277 A1 | 12/2012 | Garcia |
| 2012/0310426 A1 | 12/2012 | Tarnowski |
| 2013/0010505 A1 | 1/2013 | Bo et al. |
| 2013/0015710 A1 | 1/2013 | Rotzoll et al. |
| 2013/0018516 A1 | 1/2013 | Chee et al. |
| 2013/0035802 A1 | 2/2013 | Khaitan et al. |
| 2013/0062957 A1 | 3/2013 | Bhavaraju et al. |
| 2013/0287568 A1 * | 10/2013 | Miranda ................ F03D 7/0224 416/1 |
| 2014/0062097 A1 | 3/2014 | Brown et al. |

(56) References Cited

U.S. PATENT DOCUMENTS

| | | | |
|---|---|---|---|
| 2015/0084346 A1* | 3/2015 | Tomigashi | F01K 13/02 290/40 R |
| 2015/0349661 A1* | 12/2015 | Kunin | H05K 1/141 363/132 |
| 2017/0250534 A1* | 8/2017 | Yu | H02J 3/18 |

FOREIGN PATENT DOCUMENTS

| | | |
|---|---|---|
| KR | 10-2012-0113340 | 10/2012 |
| WO | WO-2008/122293 | 10/2008 |
| WO | WO-2010/060903 | 6/2010 |
| WO | WO-2011/026250 | 3/2011 |
| WO | WO-2011/120523 | 10/2011 |
| WO | WO-2011/160643 | 12/2011 |
| WO | WO-2012/022353 | 2/2012 |
| WO | WO-2012/073228 | 6/2012 |
| WO | WO-2012/171532 | 12/2012 |

OTHER PUBLICATIONS

Hannes Knopf, International Grid Codes and Local Requirements—the Evolement of Standards for Distributed Energy Resources and Inverter Technolgy, SMA Solar Technology AG, 5th International Conference on Integration of Renewable and Distributed Energy Resources, Berlin, dated Dec. 4-6, 2012.
PVI-3.8, PVI-4.6 (Isolated), Aurora Uno (Signle Phase) Power-One Inc., accessed Mar. 20, 2013.
SolarEdge Inverter Compliance with New German Grid Code, SolarEdge Technologies, accessed Mar. 20, 2014.
Extended European Search Report for European Patent Application No. 15850432.4, dated May 4, 2018, 10 pages.

\* cited by examiner

PROGRAMMABLE INVERTER FOR CONTROLLABLE GRID RESPONSE

BACKGROUND

In general, one or more generator sets may be connected in parallel with other generator sets, which are connected to an electrical grid. For example, a particular generator set may be connected to a local power grid and be utilized to supply power to the grid. In such a configuration, grid compliance codes and requirements must be satisfied in order for the generator set to be properly and legally connected to the grid. For example, a typical grid compliance code relates to low voltage ride through (LVRT) capabilities of a generator set, specifying how the generator set must handle a low or zero voltage event on the local utility grid and how long it must remain connected and exporting power to provide support to the local grid through the event. However, as different geographical areas (e.g., different countries, different localities, etc.) have different grid requirements, achieving universal compliance with such varying grid codes by a particular generator set model has become increasingly difficult, particularly as power generation by generator sets and other renewables (solar, geothermal, wind, etc.) become a larger and more prominent component of power generation.

SUMMARY

Disclosed herein are systems, methods, and computer-readable media for a programmable inverter for a controllable grid response. One embodiment relates to a system for providing programmable grid response characteristics. The system comprises a generator set having an alternator output voltage, wherein the alternator output voltage is rectified to provide DC power to a DC bus of the generator set. The system further comprises a programmable inverter comprising power electronics configured to receive a response requirement corresponding to a code requirement of a grid, receive the DC power from the DC bus; and condition the DC power based on the response requirement to provide an AC output response, wherein the AC output response meets specifications of the response requirement.

Another embodiment relates to a method of providing programmable grid response characteristics. The method comprises providing, by a generator set, an alternator output voltage; rectifying the alternator output voltage to provide DC power to a DC bus of the generator set; receiving, by a programmable inverter comprising power electronics, a response requirement corresponding to a code requirement of a grid; receiving, by the programmable inverter, the DC power from the DC bus; and conditioning, by the programmable inverter, the DC power based on the response requirement to provide an AC output response, wherein the AC output response meets specifications of the response requirement.

Another embodiment relates to a system for providing programmable grid response characteristics, comprising a generator set configured to generate and output AC power. The system further comprises a rectifier coupled to the generator set and configured to receive the AC power and convert the AC power into DC power. The system further comprises an inverter coupled to the rectifier, comprising a transceiver configured to receive a transmitted response requirement corresponding to a code requirement of a grid. The inverter further comprises programmable power electronics configured to receive the DC power and condition, as specified by the response requirement, the DC power to provide an AC output response, wherein the AC output response is formed according to specifications of the response requirement. The inverter further comprises one or more processors configured to analyze the response requirement to determine the specifications of the response requirement, and control operation of the programmable power electronics to convert the DC power to the AC output response based on the response requirement.

Another embodiment relates to a system, comprising a plurality of generator sets, each generated set having an alternator output voltage, wherein the alternator output voltage is rectified to provide DC power to a DC bus. The system further comprises a plurality of programmable inverters, each of the plurality of programmable inverters connected to a generator set, wherein each programmable inverter comprises power electronics configured to receive a response requirement corresponding to a code requirement of a grid, receive DC power from a DC bus of a corresponding generator set, and condition the DC power based on the response requirement to provide an AC output response, wherein the AC output response meets specifications of the response requirement.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

DETAILED DESCRIPTION

Figure 1:
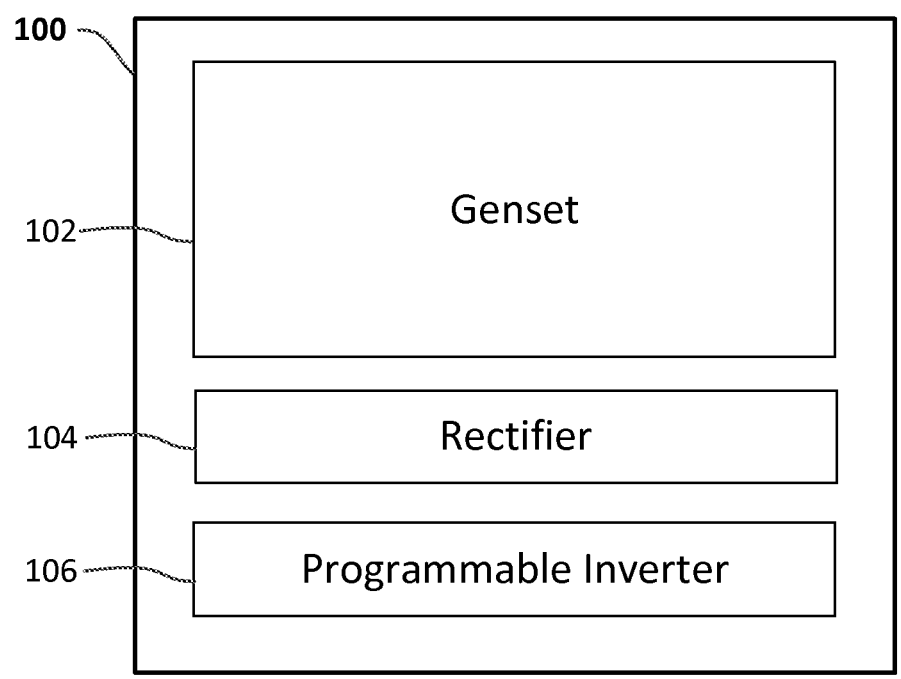
FIG. 1 shows a block diagram of a system including a programmable inverter for a grid response, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are techniques for using a programmable inverter to create a particular grid response. In general, for traditional high horsepower (HHP) and other grid paralleling generator sets (gensets) (e.g., direct grid connected stator-alternator gensets), having to meet stringent low voltage ride through (LVRT) and other grid compliance codes has become an increasingly difficult task. Accordingly to the disclosure herein, a programmable inverter can be utilized to control its output response in order to allow a genset to connect indirectly to a grid and thereby more easily meet grid code requirements. Accordingly, power may be supplied by a genset and conditioned by a programmable inverter such that the overall output response of the genset/inverter pair may be controlled to match a particular need or application. In this manner, such a genset/programmable inverter configuration enables grid code matching and compliance from jurisdiction to jurisdiction, typically without having to alter existing genset hardware.

Referring to FIG. 1, block diagram of a system 100 is shown, according to one embodiment. System 100 includes a genset 102, which may be a high horsepower genset (e.g., a large displacement natural gas or diesel genset, etc.) or other grid paralleling capable genset (e.g., a synchronous or variable speed genset). In general, genset 102 comprises an electrical generator/alternator and an engine (i.e., the prime mover) which powers the generator in order to produce electrical power output. The output of genset 102 may be provided to a bus that is coupled to rectifier 104. Rectifier 104 can receive the power, where it is converted to DC power. The rectified DC power may be output by rectifier 104 to a DC bus, which is coupled to programmable inverter 106. In one embodiment, rectifier 104 comprises an active rectifier stage that may be used to boost the DC voltage placed on the DC bus utilizing active switching components (transistors, FETs, etc.) over what would normally be available if the voltage was passively rectified with a conventional passive diode-based rectifier. Prime movers often have operating ranges, such as specific speed and torque outputs, where they are most efficient. Thus, in this configuration, as the voltage is boosted by the rectifier 104, the prime mover of the corresponding genset may be run at a reduced operating speed and/or power output to increase efficiency at low demand loading.

Programmable inverter 106 is configured to receive DC power from a DC bus and condition the DC power to a required AC output (e.g., a grid paralleling AC output, etc.). In general, programmable inverter 106 comprises the power electronics (e.g., controllers/processors, memory, transmitters, receivers, etc.) necessary to receive a power response requirement and condition an output and transient response. In this manner, the output and transient response of inverter 106 can be programmable as it is controlled by the power electronics. In one embodiment, programmable inverter 106 includes a communication connection (e.g., a wired or wireless connection) via which configuration data including a response requirement may be transmitted and received. Based on received configuration data, a particular output and transient response may be specified.

The configuration of system 100 allows a single genset design (e.g., genset 102) to meet multiple conditions and country grid codes via a software change or update that may be transmitted to inverter 106. In one embodiment, the configuration data specifies a low voltage ride through (LVRT) output model, which may correspond to a country or grid code. In this manner, the LVRT configuration of the inverter 106 may be configured to handle various LVRT events and may be configured according to different country and grid codes, even when using a single type of genset 102. In one embodiment, such LVRT output models can be field updated/flashed via the communication connection of inverter 106. For example, as new code changes come into effect or updates become available, a particular output model or configuration setting may be adjusted by transmitting relevant update data to inverter 106. Further, a response requirement can be based on a target location or target country or target grid code of where the power generated by the genset is to be provided. Alternatively, several differing grid responses may be programmed into the inverter and selected during configuration or by input from the genset controller or via the communication connection. It is further noted that grid responses can even be changed on the fly during operation of the genset as need or mission changes (for example, prime power generation to grid stability, transient suppression, power factor correction, providing grid reference, grid following mode, harmonic suppression, or to island mode power generation).

The output response of the programmable inverter 106 can be remotely or locally programmed, and therefore the inverter 106 can operate in manners that are typically difficult or not possible with a conventional genset. In one embodiment, inverter 106 can be programmed to alter the output of the genset to provide a conditioned response. For example, such alternation may correspond to a power factor correction (or control/mitigation), a long transmission line correction, a pole and zero compensation, a transient suppression, a selectable/programmable transient response, and/or a low voltage ride through setting. As another example, alteration of power generated by genset 102 can correspond to voltage selection and correction, and/or frequency selection and stabilization. As still another example, while in a microgrid or in island mode, inverter 106 can be programmed to provide a grid reference for other inverters on the local grid (e.g., IEEE 1547 compliant paralleling inverters, common low end solar, small home co-generation, small wind power installations, warehouses, etc.). If in communication with a local automatic transfer switch (ATS) or common grid connection, inverter 106 can work in concert with these to smoothly transition off the grid or otherwise close its connection to the grid, particularly if inverter 106 is configured to be in control of the local automatic transfer switch or common connection.

In one embodiment, the output of inverter 106 is conditioned based on a desired operational characteristic of the genset 102. By conditioning the output of the genset, power having select characteristics may be provided to a grid. For example, inverter 106 may be configured to allow the prime mover of genset 102 to run at a certain speed (e.g., a speed at which the prime mover is most efficient, etc.) or to vary its speed dependent on load demand. As another example, inverter 106 may be configured to allow genset 102 to decouple and operate its prime mover in variable speed. As another example, genset 102 may be a variable speed genset (e.g., for a large commercial application), and power supplied by genset 102 may be conditioned by inverter 106 to be matched to a particular load. As yet another example, by allowing genset 102 to run at a variable speed, a "no pole slip" response to transients can be enabled. For example, pole slip that is due to genset overspeed when load is suddenly add/removed (such as when a low voltage event occurs), and the need for quick rotational momentum change due to load transients, may each be avoided.

In one embodiment, inverter 106 allows the genset 102 to handle a load surge. For example, the power electronics of inverter 106 may be programmed to keep the output voltage and frequency of the power provided by genset 102 stable. Accordingly, the prime mover of genset 102 may then handle a sudden power demand as rotating engines naturally would (e.g., by varying the RPM of the prime mover of genset 102 and running up and down power/torque curve of the prime mover as needed, using the stored rotational momentum of the engine rotating mass/flywheel and throttle/governor response). In some embodiments, such a technique can also allow for the removal of batteries, super capacitors, other energy storage devices, etc., on the DC bus that are often required to store or supply excess power to handle demand surges or slumps. Preload resistor banks and associated automatic transfer switches, which typically allow a genset to preload (spool up to the required power output) in anticipation for a load, could also be eliminated. In such an embodiment, preloading in anticipation of a large load may be implemented by keeping output voltage and frequency stable via inverter 106 while the prime mover of the of genset 102 is allowed to reduce alternator field inputs and increase its rpm and store energy within its rotational speed in anticipation of a future load demand surge (e.g., starting a large industrial process, a search radar, a military weapons load, etc.). In general, this "flywheel" method of energy storage increases with the square of the rotating speed ($\frac{1}{2}j\omega^2$), similar to the capacitive equivalent ($\frac{1}{2}CV^2$), where the energy storage increases with the square of the voltage.

In some embodiments, however, various DC storage sources (e.g., super capacitors, batteries, etc.) are placed on the DC bus (e.g., either directly coupled or via a DC-DC converter, or other active component or coupling) to allow for a certain load surge capacity energy storage. In such an embodiment, genset 102 can be sized to a smaller model (which is typically cheaper) based on an expected average load. As the DC sources can handle surges, the excess capacity of genset 102 which would otherwise be required to handle the surges can be reduced, allowing a closer match of the genset and prime mover to anticipated demand. Alternatively, the engine/alternator of genset 102 may be allowed to slow down/lose RPM in order to accept a surge or to allow for an increase in fueling to respond and take effect. If it is known that a surge will occur (e.g., when a load such as a motor is starting, etc.) or a surge buffer is desired, a pre-surge speed-up in RPM may be implemented in order to accept the increased load, as noted above. It is noted that in the above embodiments, the inverter continues to supply the full power load demand in an instantaneous manner to the grid while the genset is decoupled from the need to support the grid and allowed to react to the load transient in a natural manner. In one alternate embodiment, genset 102 can provide "instant" grid support via one or more of the DC storage sources after a power failure while a genset 102 that was kept in standby mode or a low RPM spinning reserve is spooling up to accept a load. Such a configuration can also allow the engine of genset 102 to gently come up to speed to accept a load (which assists in avoiding damage to the engine and increases its expected life). This embodiment is advantageous in critical power applications (e.g., data center applications, hospitals, etc.), as it potentially allows for uninterruptible power supplies (which would typically be required to support a local grid as gensets prepare to accept loads) to be eliminated.

The genset 102 and inverter 106 may be configured with a local storage (e.g., a battery) device as discussed above and are attached to a weak grid. In such a configuration, genset 102 and inverter 106 may serve as a grid stabilizer and provide power support as needed, triggering operation of the prime mover only as required by the local energy storage levels. Also, the local storage can be recharged once the grid is stable/strong again to prepare for the next instability period. For example, energy may be stored/retrieved from the storage device without having to start the engine of genset 102, or in a manner that minimizes engine run time. In another embodiment, genset 102 and inverter 106 are attached to an unstable grid. In such a configuration, genset 102 and inverter 106 may serve as a paralleled genset tuner or stabilizer. For example, genset 102 and inverter 106 can compensate the power at the end of a long transmission line. As another example, genset 102 and inverter 106 can eliminate unstable grid harmonics. In this manner, inverter 106 may be programmed to compensate for other paralleled genset instabilities or unstable genset farm/microgrid harmonics.

The architecture of system 100 further allows for a "limp home," or fall back, power generation mode. For example, in a scenario where rectifier 104 and/or inverter 106 are damaged, inoperable, or otherwise removed, the alternator of genset 102 may then be connected directly to the grid (or micro grid) to allow genset 102 to temporarily generate power (i.e., as a conventional synchronous genset) while the inverter or rectifier stages are repaired or replaced. In one embodiment, an automatic transfer switch may be incorporated into system 100 and configured to automatically place genset 102 in such a "limp home" mode. For example, genset 102 may be placed in such mode when rectifier 104 or inverter 106 is damaged or inoperable. In another embodiment, multiple inverters or multiple gensets can be paralleled via the DC bus and utilized to increase the fault tolerance of genset 102 to possible single point failures for critical service installations (e.g., hospitals, military, etc.). Additionally, such redundancy and/or DC paralleling allows for the use of lower cost components, such as smaller commercial/off-the-shelf inverter components, such that instead of one large inverter, two or more smaller inverters can be DC paralleled and used to output power to the local grid. In addition, other sources of power (such as, but not limited to, solar panels, wind generators, small scale hydroelectric, geothermal, turbogenerators, or heat recovery power generation) can be coupled to the DC bus and utilized to provide power to the inverter or coupled storage device and reduce or eliminate power demand from the prime mover and alternator. In one embodiment, the genset is utilized to provide a power inverter for a wind turbine or solar power installation, and then operate the prime mover and alternator to provide fill-in power when power input from these sources is inadequate or lacking. In yet a further embodiment, multiple gensets of differing power ratings can be either DC paralleled via the DC bus, or AC paralleled via the local grid and the system select the a specific set of gensets to operate to most efficiently match the current power demand of the local grid.

Figure 2:
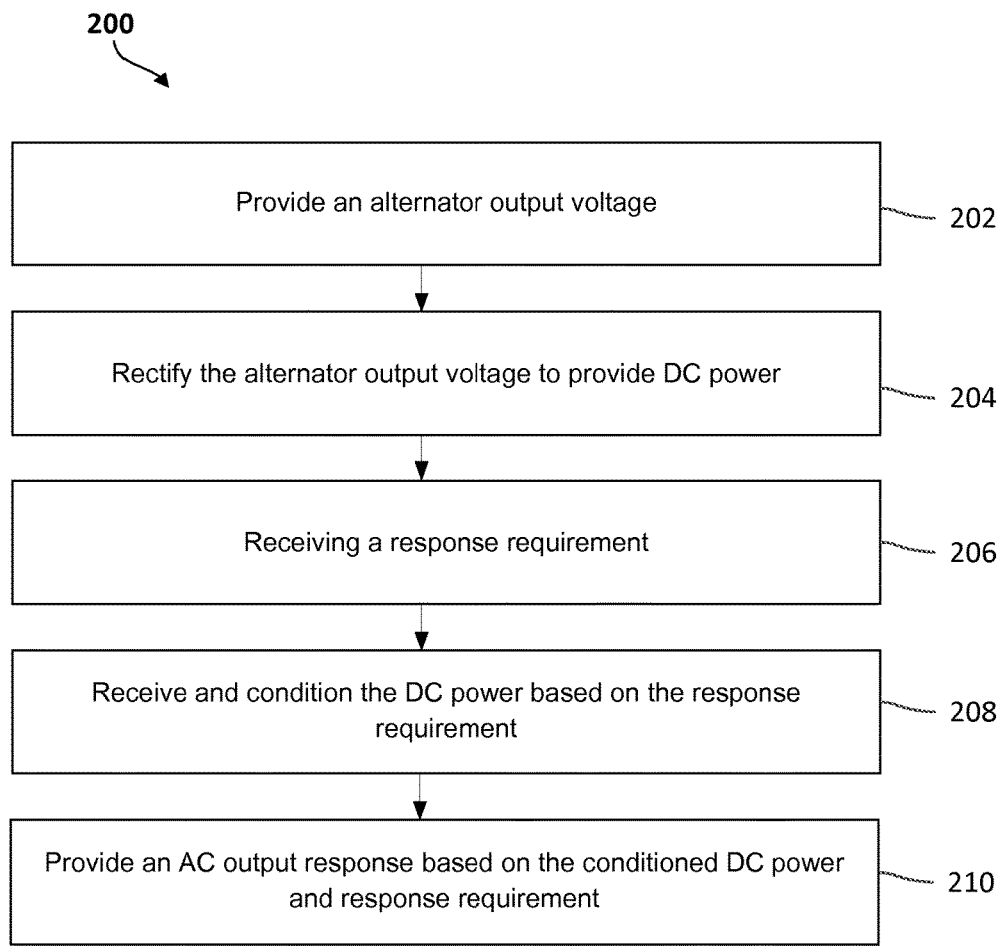
FIG. 2 is a flowchart of a process for using a programmable inverter to create a grid response, according to one embodiment.

Referring to FIG. 2, a flow diagram of a process 200 for using a programmable inverter to condition a grid response is shown, according to an embodiment. In alternative embodiments, fewer, additional, and/or different steps may be performed. Also, the use of a flow diagram is not meant to be limiting with respect to the order of steps performed. Process 200 includes providing an alternator output voltage (202). Such output voltage may be provided by a genset (e.g., genset 102). The output voltage is provided to a rectifier (e.g., rectifier 104), which may rectify the output voltage in order to provide DC power (204). The DC power may be output to a DC bus corresponding to the genset. A response requirement may be received (206) by a programmable inverter (e.g., inverter 106). The response requirement can specify a power conditioning requirement. For example, the response requirement may be based on a low voltage ride through requirement or a grid compliance code, etc. The DC power may be received, via the DC bus, by the programmable inverter. Based on the response requirement, the programmable inverter can condition the DC power (208) to provide a particular AC output and transient response (210). Such an output may then be supplied to a grid or other device, in compliance with the response requirement.

Figure 3:
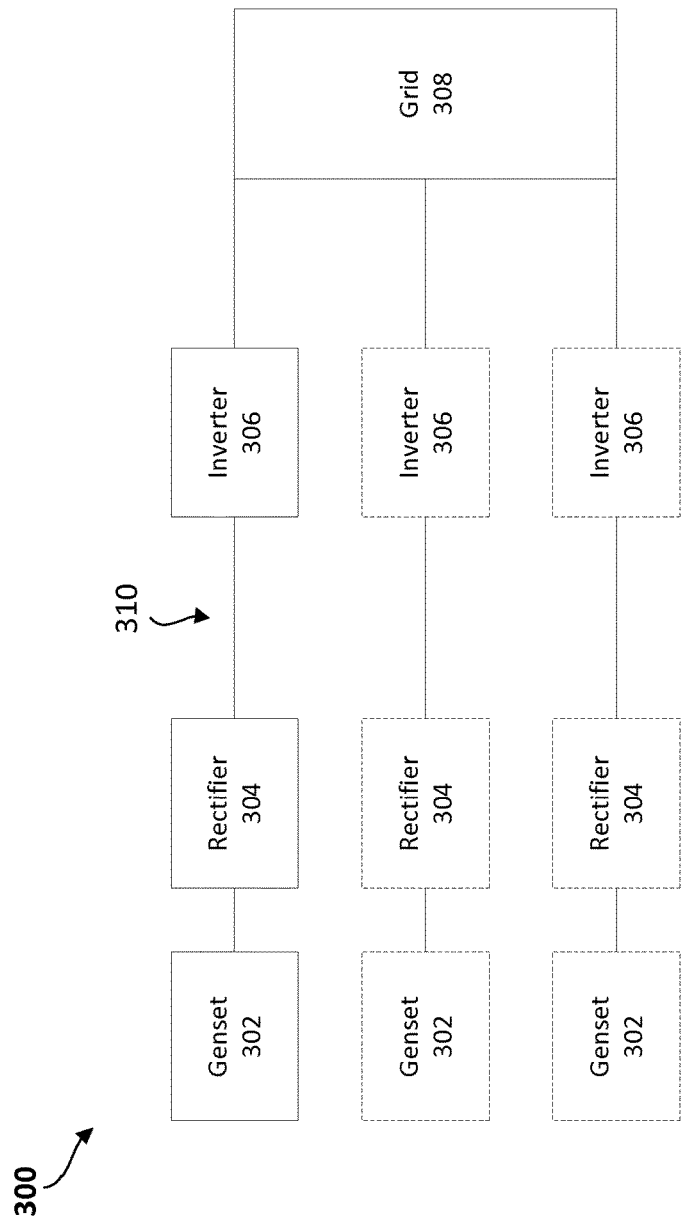
FIG. 3 is a block diagram of a system of programmable inverters and paralleling gensets, according to one embodiment.

Referring to FIG. 3, a block diagram of a generation system 300 of programmable inverters and paralleling gensets is shown, according to one embodiment. System 300 depicts multiple paralleled gensets 302 and corresponding rectifiers 304 and programmable inverters 306. Gensets 302 may be any of the genset configurations as discussed herein (e.g., high horsepower gensets, other grid paralleling gensets, etc.). As depicted, multiple gensets 302 may be connected in parallel to a grid 308. In some embodiments, grid 308 is a microgrid or is part of a larger grid system. By transmitting response requirements to the inverters 306, an operator can control and condition the power provided by the corresponding gensets 302 in order to meet compliance codes for grid 308. For example, gensets 302 may be required to provide a certain response during low voltage ride through (LVRT) conditions. Additionally, the architecture a genset 302 can include a common DC bus as described herein. Such a DC bus can allow for the genset 302 to directly support high voltage DC transmission feeds/lines by utilizing the DC bus at high voltages. For example, high voltage DC transmission lines or a local high voltage DC bus system (e.g., at a Data Center) may be directly or indirectly coupled to the DC bus.

In one embodiment, multiple gensets 302 and/or inverters 306 may be paralleled on/off DC bus 310 to allow system 300 to be constructed to meet a customer's need, or according to component costs and availability. For example, gensets 302 may be of multiple different sizes/specifications and can be matched with multiple inverter 306 sizes to best meet a customer needs or implement a certain configuration. Gensets 302 and inverters 306 can be hot swapped off and on to DC bus 310 as needed. Hot swapping support allows for unit replacement or maintenance without needing to bring down the entire system 300. Hot swapping support also allows for bringing on additional gensets 302 and inverters 306 (or removing them) as load demand increases or decreases and can allow for gensets 302 and inverters 306 to be utilized based on operator/customer selected criteria. For example, an operator may decide to run system 300 according to a "wear leveling" plan, so that the gensets 302, rectifiers 304, and inverters 306 with the least amount of hours are used first and wear is leveled between the gensets 302, rectifiers 304, and inverters 306. As another example, gensets 302, rectifiers 304, and inverters 306 may be used based on a cost of fuel or total cost of ownership configuration, such that those gensets 302, rectifiers 304, and inverters 306 that have the lowest fuel costs and costs of ownership are used first. In one embodiment, DC bus 310 can also allow for other alternative sources of power generation (e.g., wind sources, solar sources, fuel cell sources, etc.) to be paralleled along with the gensets. Such additional sources, if available, can further reduce fuel consumption and wear of the gensets 302, rectifiers 304, and inverters 306.

In general, the multiple inverter output stages (inverters 306) or genset input stages (gensets 302) can load share or distribute an applied load from grid 308 in any manner selected. The configuration of load sharing/distribution may be controlled in part by configuration settings that are transmitted to the programmable inverters. In one embodiment, the configuration settings enable automatically sharing of a load across the inverters 306 equally. In another embodiment, the configuration settings are such that a load is shared according to rated output capabilities of the various gensets. The particular configuration of the system 300 may be in any manner as desired by an operator. In another embodiment, the inverters 306 are configured to be modular (e.g., built using modular design and components), such that they may be utilized to allow for simplified power supply chains, economy of scale, ease of maintenance, and/or ease of genset sizing. For example, in the case an inverter 306 malfunctions, it could derate its corresponding genset 302 output until the genset 302 is inoperable, or it could engage the genset 302 in a synchronous "limp home" mode where the genset 302 is placed in temporary synchronous operation (i.e., the genset 302 may temporarily generate power as a conventional synchronous genset) until repair of the damaged inverter 306 is complete.

Figure 4:
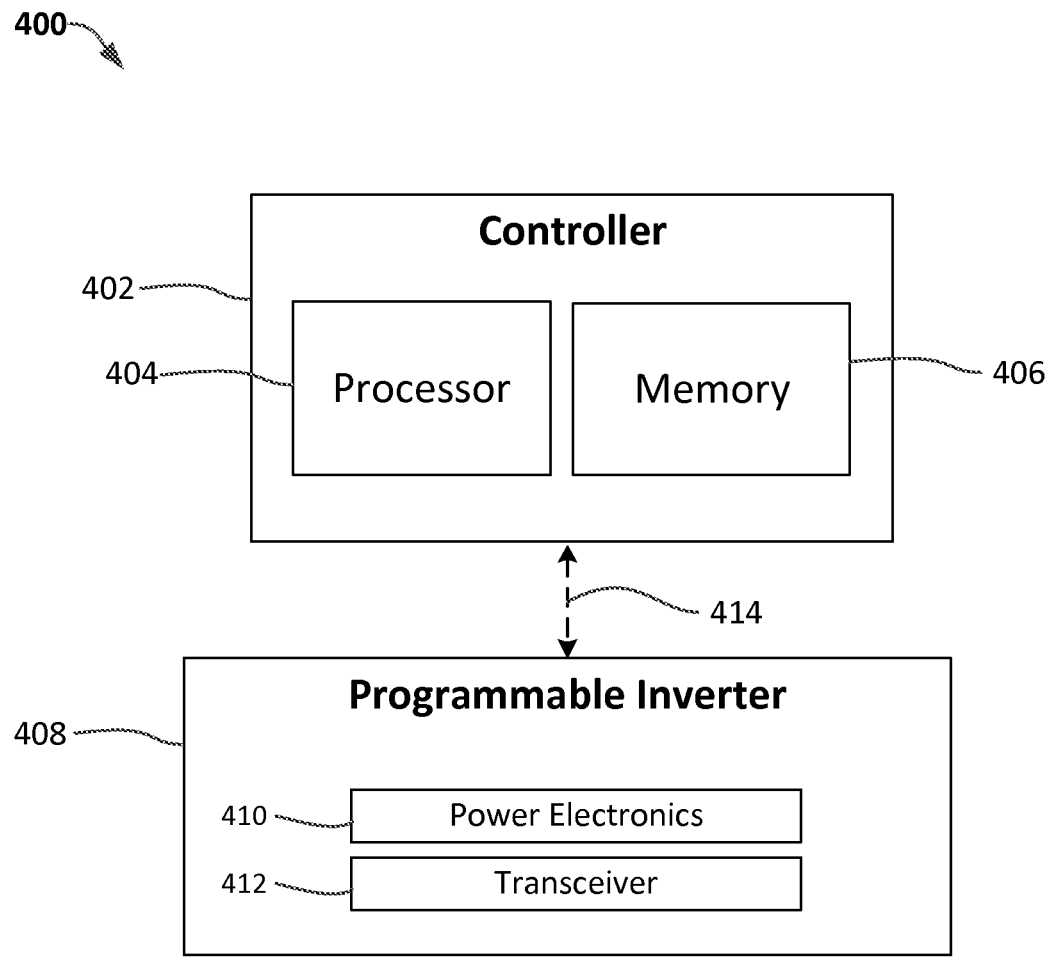
FIG. 4 is a block diagram of a system for implementing the techniques disclosed herein, according to one embodiment.

FIG. 4 depicts a system 400 which may be used to implement the techniques and methods described herein for using multiple actuators to limit engine speed. System 400 typically includes a controller 402 having at least one processor 404 coupled to a memory 406. Processor 404 may be any commercially available CPU. Processor 404 may represent one or more processors and may be implemented as a general-purpose processor, an application specific integrated circuit (ASIC), one or more field programmable gate arrays (FPGAs), a digital-signal-processor (DSP), an engine control unit (ECU), a powertrain control module (PCM), a group of processing components, or other suitable electronic processing components. Memory 406 may include random access memory (RAM) devices comprising a main storage of the controller 402, as well as any supplemental levels of memory, e.g., cache memories, non-volatile or back-up memories (e.g., programmable or flash memories), read-only memories, etc. In addition, memory 406 may include memory storage physically located elsewhere in system 400 or controller 402, e.g., any cache memory in the processor 404 as well as any storage capacity used as a virtual memory, e.g., as stored on a mass storage device, etc. Controller 402 and programmable inverter 408 may also include any additional networking components necessary to communicate with external configuration/control systems (e.g., Wi-Fi networking components, radiofrequency components, COM ports, etc.).

The controller 402 may form a portion of a processing subsystem including one or more computing devices having memory, processing, and communication hardware. Controller 402 may be a single device (e.g., controller 402 may be the processing components of or otherwise integrated into programmable inverter 408) or a distributed device, and the functions of controller 402 may be performed by hardware and/or as computer instructions on a non-transistory computer readable storage medium, and functions may be distributed across various hardware or computer based components. In certain embodiments, controller 402 is part of the power electronics 410 of a programmable inverter 408 that is configured to condition power generated by a genset as disclosed herein. For example, controller 402 may receive an output response requirement, and control power electronics 410 such that power provided by a genset is conditioned according to the response requirements in order to implement the techniques disclosed herein. In one embodiment, controller 402 may be configured to support and control multiple inverters. In such an embodiment, controller 402 can be a standalone controller device. Alternatively, controller 402 may be a controller of one of the inverters, and may function as a master controller (e.g., via communicating with and controlling other inverter controllers, etc.). In controlling an inverter as described herein, controller 402 may make use of machine learning, artificial intelligence, interactions with databases and database table lookups, pattern recognition and logging, intelligent control, neural networks, fuzzy logic, etc.

In one embodiment, controller 402 comprises the processing components (i.e. the power electronics) of an inverter device (e.g., programmable inverter 408). The inverter device is configured to receive DC power that is generated by a high horsepower (HHP) or other grid paralleling genset. Controller 402 may further be configured to interface with a controller of the genset (e.g., via transceiver 412), or may actively control operation of the genset. Controller 402 can monitor signals provided via transceiver 412 or may function in a programmed/autonomous mode (e.g., according to a schedule, etc.). For example, a certain low voltage ride through (LVRT) or other grid compliance requirement may be transmitted to controller 402. The requirement may specify a certain type of response that is required for the genset (and inverter) to be coupled to the grid. Controller 402 may analyze the requirement, and generate the signals necessary to control the power electronics 410 of the programmable inverter 408. In general, power electronics 410 includes components and circuitry necessary to controllably condition a DC power signal to provide an AC output response. Based on the requirement, controller 402 can cause the power electronics 410 of programmable inverter 408 to output an appropriate AC output response from the DC power supplied by the genset. In this manner, programmable inverter 408 can allow the genset to connect indirectly (e.g., via the programmable inverter 408) to a grid and meet grid code requirements In general, the routines executed to implement the embodiments may be implemented as part of an operating system or a specific application, module, or sequence of instructions. In certain embodiments, controller 402 includes one or more modules structured to functionally execute the operations of controller 402 to control the power electronics of a programmable inverter and to send and receive data via transceiver 412. The description herein including modules emphasizes the structural independence of the aspects of the controller 402, and illustrates one grouping of operations and responsibilities of the controller 402. More specific descriptions of certain embodiments of controller 402 operations are described by the sections herein referencing FIGS. 1-3. Other groupings that execute similar overall operations are understood within the scope of the present application. The modules typically comprise one or more instructions set at various times in various memory and storage devices in a computer, and that, when read and executed by one or more processors in a computer, cause the computer to perform operations necessary to execute elements of disclosed embodiments. For example, in an embodiment where controller 402 comprises the processing components of a programmable inverter, such modules may comprise the one or more modules of the processing components. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks, flash memory, among others.

Example and non-limiting module implementation elements include the circuitry, sensors, systems, and/or connections required to allow controller 402 to communicate with the components of an inverter, to adjust operation settings related to the inverter, and to communicate with external systems and devices as discussed herein. Such devices each may be communicably coupled to controller 402 and provide any value determined herein. Example and non-limiting module implementation elements may further include devices for providing any value that is a precursor to a value determined herein, data links and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any valve actuator including at least an electrical, hydraulic, or pneumatic actuator, a solenoid, an op-amp, analog control elements (springs, filters, integrators, adders, dividers, gain elements), and/or digital control elements.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:
1. A system for providing programmable grid response characteristics, comprising:

a generator set having an alternator output voltage, wherein the alternator output voltage is rectified to provide DC power to a DC bus of the generator set; and a programmable inverter comprising power electronics configured to:
- store a plurality of differing response requirements each corresponding to one of a plurality of differing grid code requirements of a plurality of grids, each of the differing grid code requirements relating to compliance requirements of a jurisdiction for connecting to one of the plurality of grids,
- select a response requirement from the plurality of response requirements, the selected response requirement corresponding to a grid code requirement of a first grid to which the system is connected or is to be connected from among the plurality of grids,
- receive the DC power from the DC bus, and
- condition the DC power based on the selected response requirement to provide an AC output response, wherein the AC output response meets specifications of the selected response requirement.

2. The system of claim 1, wherein the grid code requirement is based on a low voltage ride through (LVRT) output requirement.

3. The system of claim 1, wherein the selected response requirement is based on one of a target country, a target location, a target grid code response or a target generator set mode of operation of the programmable inverter.

4. The system of claim 3, wherein the selected response requirement is based on the target location of the AC output response of the programmable inverter.

5. The system of claim 1, wherein the programmable inverter is configured to update the selected response requirement responsive to a code change or other output response update.

6. The system of claim 1, wherein the system is on a microgrid of a grid, and wherein the programmable inverter is configured to function in an island mode for the microgrid.

7. The system of claim 6, wherein while in the island mode the programmable inverter is configured to provide a grid reference for one or more additional grid following inverters on the microgrid.

8. The system of claim 1, further comprising one or more additional DC sources coupled to the DC bus, wherein the one or more additional DC sources are configured to allow for a load surge capacity by providing additional DC power.

9. The system of claim 8, wherein the one or more additional DC sources are one or more storage devices and the generator set is sized based on the additional DC power and an expected average load of the generator set.

10. The system of claim 1, further comprising an active rectifier stage configured to boost DC voltage of the DC bus to allow a prime mover of the generator set to operate at a reduced operating speed or reduced power output setting.

11. The system of claim 1, further comprising a battery coupled to the DC bus and configured to provide power to the grid when power of the generator set is cycled off.

12. The system of claim 1, wherein the generator set is configured to support a gradual start-up upon connection of a load.

13. The system of claim 1, wherein the programmable inverter is configured to receive commands and modify a response of the programmable inverter based on the commands during operation.

14. The system of claim 1, wherein the programmable inverter is configured to decouple an AC transient response of the programmable inverter from a transient response of at least one of a prime mover or an alternator of the generator set.

15. The system of claim 1, wherein the generator set is configured to provide a low RPM spinning reserve mode when a load is not connected to the generator set, and wherein the generator set is configured to spool up out of the low RPM spinning reserve mode upon connection of the load.

16. The system of claim 1, wherein the system further comprises a plurality of generator sets and a plurality of programmable inverters, wherein the generator set is one of the plurality of generator sets and the programmable inverter is one of the plurality of programmable inverters, each of the plurality of generator sets coupled to one of the plurality of programmable inverters.

17. The system of claim 16, wherein at least one of the plurality of generator sets and at least one of the plurality of programmable inverters are configured to be hot swappable on to a common DC bus.

18. The system of claim 16, wherein the plurality of generator sets and the plurality of programmable inverters are coupled to a common DC bus in a DC parallel configuration.

19. The system of claim 16, wherein the plurality of programmable inverters are coupled to a common local grid in an AC parallel configuration.

20. The system of claim 16, wherein each of the plurality of programmable inverters is configured to provide an equal AC output response to a load.

21. The system of claim 20, further comprising a controller configured to control the plurality of programmable inverters, and wherein each of the plurality of programmable inverters is configured to provide an AC output response as controlled by the controller.

22. The system of claim 21, wherein the controller is configured to control the plurality of programmable inverters to reduce a fuel consumption across the plurality of generator sets.

23. The system of claim 21, wherein the controller is configured to control the plurality of programmable inverters to provide a stable combined power output level across the plurality of generator sets.

24. A method of providing programmable grid response characteristics, comprising:
- providing, by a generator set, an alternator output voltage;
- rectifying the alternator output voltage to provide DC power to a DC bus of the generator set;
- selecting, by a programmable inverter comprising power electronics, a response requirement from a plurality of differing response requirements stored in the programmable inverter, each of the plurality of differing response requirements corresponding to one of a plurality of differing grid code requirements of a plurality of grids, each of the differing grid code requirements relating to compliance requirements of a jurisdiction for connecting to one of the plurality of grids, wherein the selected response requirement corresponds to a grid code requirement of a grid to which the programmable inverter is connected or is to be connected;
- receiving, by the programmable inverter, the DC power from the DC bus; and
- conditioning, by the programmable inverter, the DC power based on the selected response requirement to provide an AC output response, wherein the AC output response meets specifications of the selected response requirement.

25. The method of claim 24, wherein the grid code requirement is based on a low voltage ride through (LVRT) output requirement.

26. The method of claim 24, wherein the selected response requirement is based on a target location or target grid code of the AC output response of the programmable inverter.

27. The method of claim 24, further comprising updating the selected response requirement responsive to a code change or other output response update.

28. The method of claim 24, further comprising:
coupling one or more additional DC sources couple to the DC bus; and
providing additional DC power, by the one or more additional DC sources, to the programmable inverter.

29. The method of claim 28, wherein the additional DC sources are storage devices and further comprising sizing the generator set based on the additional DC power, a required load surge capacity, and an expected average load of the generator set.

30. The method of claim 24, further comprising boosting, by an active rectifier stage, DC voltage of the DC bus to allow a prime mover of the generator set to operate at a reduced operating speed or reduced power output setting.

31. The method of claim 24, further comprising operating the generator set in a fall back power generation mode by disconnecting the programmable inverter and connecting the alternator output voltage directly to a grid to output voltage directly to the grid as a synchronous generator.

32. The method of claim 24, further comprising anticipating a load surge, wherein anticipating the load surge comprises:
keeping, by the programmable inverter, the AC output response stable and;
allowing a prime mover of the generator set to increase in rotational speed and store energy in response to the increased rotational speed of the prime mover.

33. The method of claim 24, further comprising utilizing the generator set as a replacement for an uninterruptible power supply in a data center.

34. The method of claim 24, further comprising coupling the generator set to a renewable energy source configured to utilize the generator set to supplement power generated by the renewable energy source.

35. A system for providing programmable grid response characteristics, comprising:
a generator set configured to generate and output AC power;
a rectifier coupled to the generator set and configured to:
receive the AC power, and
convert the AC power into DC power; and
one or more inverters coupled to the rectifier, each inverter comprising:
a transceiver configured to receive a transmitted response requirement corresponding to a grid code requirement of a grid;
programmable power electronics configured to:
store a plurality of differing response requirements each corresponding to one of a plurality of differing grid code requirements of a plurality of grids, each of the differing grid code requirements relating to compliance requirements of a jurisdiction for connecting to one of the plurality of grids,
select a response requirement from the plurality of response requirements, the selected response requirement corresponding to a grid code requirement of a first grid to which the system is connected or is to be connected from among the plurality of grids,
receive the DC power, and
condition, as specified by the selected response requirement, the DC power to provide an AC output response, wherein the AC output response is formed according to specifications of the selected response requirement; and
one or more processors configured to:
analyze the selected response requirement to determine the specifications of the selected response requirement, and
control operation of the programmable power electronics to convert the DC power to the AC output response based on the selected response requirement.

36. The system of claim 35, wherein the one or more processors are further configured to:
receive, via the transceiver, a code update or other output response update, and
update the selected response requirement responsive to the received update.

37. The system of claim 35, wherein the grid code requirement specifies a low voltage ride through (LVRT) output requirement.

38. The system of claim 37, wherein the selected response requirement is based on a target location or target grid code of the AC output response.

39. The system of claim 38, wherein the rectifier comprises an active rectifier stage configured to boost the DC power to allow a prime mover of the generator set to operate at a reduced operating speed or reduced power output setting.

40. The system of claim 39, wherein the generator set is a variable speed genset, and wherein the AC output response is conditioned to match a particular load.

41. The system of claim 40, further comprising one or more DC sources coupled to a DC bus of the system, the one or more DC sources configured to allow for one or more of lower AC power output of the generator set or a load surge capacity by providing additional DC power.

42. The system of claim 35, wherein:
the programmable power electronics are further configured to condition, as specified by the selected response requirement, the DC power to provide a second AC output response, wherein the second AC output response is formed according to the specifications of the selected response requirement; and
the one or more processors are further configured to control operation of the programmable power electronics to convert the DC power to the second AC output response based on the selected response requirement.

* * * * *